United States Patent
Perduta et al.

(10) Patent No.: US 8,424,846 B1
(45) Date of Patent: Apr. 23, 2013

(54) OVERLOAD WARNING SYSTEM FOR A WINCH HOIST

(75) Inventors: Richard A. Perduta, Grafton, MA (US); David B. Hallen, Rutland, MA (US)

(73) Assignee: Lincoln Precision Machining Company, North Grafton, MA (US)

( * ) Notice: Subject to any disclaimer, the term of this patent is extended or adjusted under 35 U.S.C. 154(b) by 424 days.

(21) Appl. No.: 12/885,783

(22) Filed: Sep. 20, 2010

Related U.S. Application Data (60) Provisional application No. 61/243,589, filed on Sep. 18, 2009.

(51) Int. Cl.
*B21F 9/00* (2006.01)
*B66F 3/00* (2006.01)

(52) U.S. Cl.
USPC ........... 254/243; 254/218; 254/237; 254/223; 403/2; 74/545

(58) Field of Classification Search .................. 254/237, 254/243; 74/545; 403/2
See application file for complete search history.

(56) References Cited

U.S. PATENT DOCUMENTS

| | | | | |
|---|---|---|---|---|
| 3,561,285 | A * | 2/1971 | Hallen | 74/524 |
| 3,602,065 | A * | 8/1971 | Ratcliff | 74/524 |
| 3,707,885 | A * | 1/1973 | Profet | 74/524 |
| 4,045,001 | A * | 8/1977 | Harvey, Jr. | 254/369 |
| 4,097,024 | A * | 6/1978 | Schreyer | 254/266 |
| 4,330,926 | A * | 5/1982 | McCall | 29/525.01 |
| 5,301,389 | A * | 4/1994 | Engel et al. | 16/422 |
| 6,637,287 | B2 * | 10/2003 | Griffin | 74/545 |
| 7,374,152 | B2 * | 5/2008 | Ruan | 254/217 |
| 7,707,696 | B2 * | 5/2010 | Ruan | 24/68 CD |

OTHER PUBLICATIONS

Lincoln Hoist Catalog, Lincoln Precision Machining Corp., publication No. 219, last revised May 2010, 4 pages; http://www.lincolnhoist.com/brochures.shtml; Standard Series Hoist Model LH-6000-15 schematic; last revised Feb. 10, 2010; last accessed Apr. 25, 2011.

\* cited by examiner

*Primary Examiner* — Emmanuel M Marcelo
(74) *Attorney, Agent, or Firm* — Mirick, O'Connell, DeMallie & Lougee, LLP

(57) ABSTRACT

An overload warning system for a winch hoist of the type that includes a drum that rotates about a drum shaft, a handle that is received in a socket, wherein the handle can be used to turn the drum, and a movable frame that is located between the socket and the housing. The socket is coupled to the drum shaft. There is a shear pin with one end embedded in the frame and the other end embedded in the socket, the shear pin defining a relatively weak shear zone located between the frame and the socket. There is an elongated opening defined in the socket and a projection projecting from the frame and into or through the elongated opening. If the shear pin fails under rotational load applied through the handle, the socket will rotate relative to the frame until the edge of the elongated opening contacts the projection. The socket movement provides tactile feedback that the shear pin has failed, while maintaining control over the hoist operation via the handle.

12 Claims, 9 Drawing Sheets

FIG 9

OVERLOAD WARNING SYSTEM FOR A WINCH HOIST

CROSS-REFERENCE TO RELATED APPLICATION

This application claims priority of Provisional Patent Application Ser. No. 61/243,589, filed on Sep. 18, 2009.

FIELD

This disclosure relates to manual winch hoists.

BACKGROUND

Manual winch hoists, if they have overload protection, typically use a steel or aluminum handle which is designed to bend when overloaded. Hoists used for electric utility work typically use an insulated fiberglass handle, which will fail catastrophically when severely loaded. It is advantageous to provide an overload indication, while permitting full functionality of the hoist after overload to allow the strain to be removed and the hoist inspected and repaired.

Ratchet winch hoists use a main housing supported by a hook to support a load though a lifting medium such as nylon strap or wire or synthetic rope. There is often a sheave block attached which doubles the line back to the housing, and attaches through a means such as a slip hook and an eye bolt. There is a handle attached by some means to a movable frame as a means to provide leverage. Ratchet teeth on the drum allow a movable pawl and a holding pawl to interact through a spring to allow raising and lowering the load. A wind-up wheel may be used for rapid winding when the line is not under load.

The attachment of the handle to the movable frame becomes a convenient means for providing protection against overloading the hoist. Prior art provides such protection through the use of an articulated arm assembly with built in pivot, a handle socket that is constrained by projecting ears that are part of the movable frame, or a bendable metal extension added to the end of the fiberglass handle. These have drawbacks such as adding electrically conductive length to the assembly which must be swung between conductors that may be in close proximity, size, weight and/or cost.

SUMMARY

This disclosure features an overload warning system for a winch hoist of the type that includes: a drum that rotates within a housing about a drum shaft; a handle that is received in a socket that is coupled to the drum shaft wherein the handle can be used to turn the drum via a pawl that interacts with cast teeth on the drum; and a movable frame that is located between the socket and the housing. An embodiment of the system comprises a shear pin embedded in the frame and embedded in the socket, and defining a relatively weak shear zone located between the frame and the socket, an elongated opening defined in the socket, and a projection projecting from the frame and into or through the elongated opening. If the shear pin fails under rotational load applied through the handle the socket will rotate relative to the frame until the edge of the elongated opening contacts the projection, such that the socket movement provides tactile feedback that the shear pin has failed while maintaining control over the hoist operation via the handle.

The hoist may include a movable pawl carried by a pawl shaft, and the projection may be an extension of the pawl shaft. The socket may define a flange that lies adjacent to but spaced from the frame. The frame may define a thickened leg that is adjacent to the socket flange. The pin may be held in the socket flange and in the thickened leg, and span the space between them. The system may further include hardened bushings in the socket flange and the leg that hold the pin. The pin may define a reduced cross-sectional area that is located in the space between the socket flange and the thickened leg so as to define a pin shear zone.

The pawl shaft extension may define an end that is located in or immediately adjacent to the elongated opening. The pawl shaft extension end may be held in the socket such that the socket can move relative to the pawl shaft until the pawl shaft extension contacts the edge of the elongated opening. The pawl shaft may be closer to the drum shaft than is the shear pin. The frame may define an outer contour in which case the socket may not extend beyond this contour.

In another embodiment the disclosure features an overload warning system for a winch hoist of the type that includes: a drum that rotates within a housing about a drum shaft; a handle that is received in a socket that is coupled to the drum shaft wherein the handle can be used to turn the drum via a pawl that interacts with cast teeth on the drum; and a movable frame that is located between the socket and the housing. The system comprises a shear pin embedded in the frame and embedded in the socket, and defining a relatively weak shear zone located between the frame and the socket, an elongated opening defined in the socket, and a projection projecting from the frame and into the elongated opening. The hoist includes a movable pawl carried by a pawl shaft, and the projection is an extension of the pawl shaft. The pawl shaft extension defines an end that is located in or immediately adjacent to the elongated opening. This pawl shaft extension end is held in the socket such that the socket can move relative to the pawl shaft until the pawl shaft extension contacts the edge of the elongated opening. The pawl shaft is closer to the drum shaft than is the shear pin. The socket defines a flange that lies adjacent to but spaced from the frame and the frame defines a thickened leg that is adjacent to the socket flange. The frame defines an outer contour and the socket does not extend beyond this contour. The pin is held in the socket flange and in the thickened leg and spans the space between them. There are hardened bushings in the socket flange and the leg that hold the pin. The pin defines a reduced cross-sectional area that is located in the space between the socket flange and the thickened leg so as to define a pin shear zone. If the shear pin fails under rotational load applied through the handle the socket will rotate relative to the frame until the edge of the elongated opening contacts the pawl shaft extension, such that the socket movement provides tactile feedback that the shear pin has failed while maintaining control over the hoist operation via the handle.

DETAILED DESCRIPTION

Winch hoist 50 decreases the conductive metal length 27 that must move between conductors 28, 29 when a lineman 30 actuates the winch hoist 50. Ratchet winch hoist 50 has a main housing 2 supported by a hook 1 to support a load through an appropriate lifting medium 3 of an appropriate material, e.g., nylon strap, wire rope or synthetic rope, that is guided by guide 17. A sheave block 4 doubles the line back to the housing, and attaches through an appropriate anchor system such as a slip hook 19 and an eye bolt 18, for example. There is a handle 6 attached by some means to a movable frame 8 as a means to provide leverage. Ratchet teeth on the drum 11 allow a movable pawl 9 (carried by shaft 21) and a holding pawl 12 (carried by shaft 20) to interact through a spring to allow raising and lowering the load, as is known in the art. A wind-up wheel 13 may be used for rapid winding when the line 3 is not under load.

Figure 1:
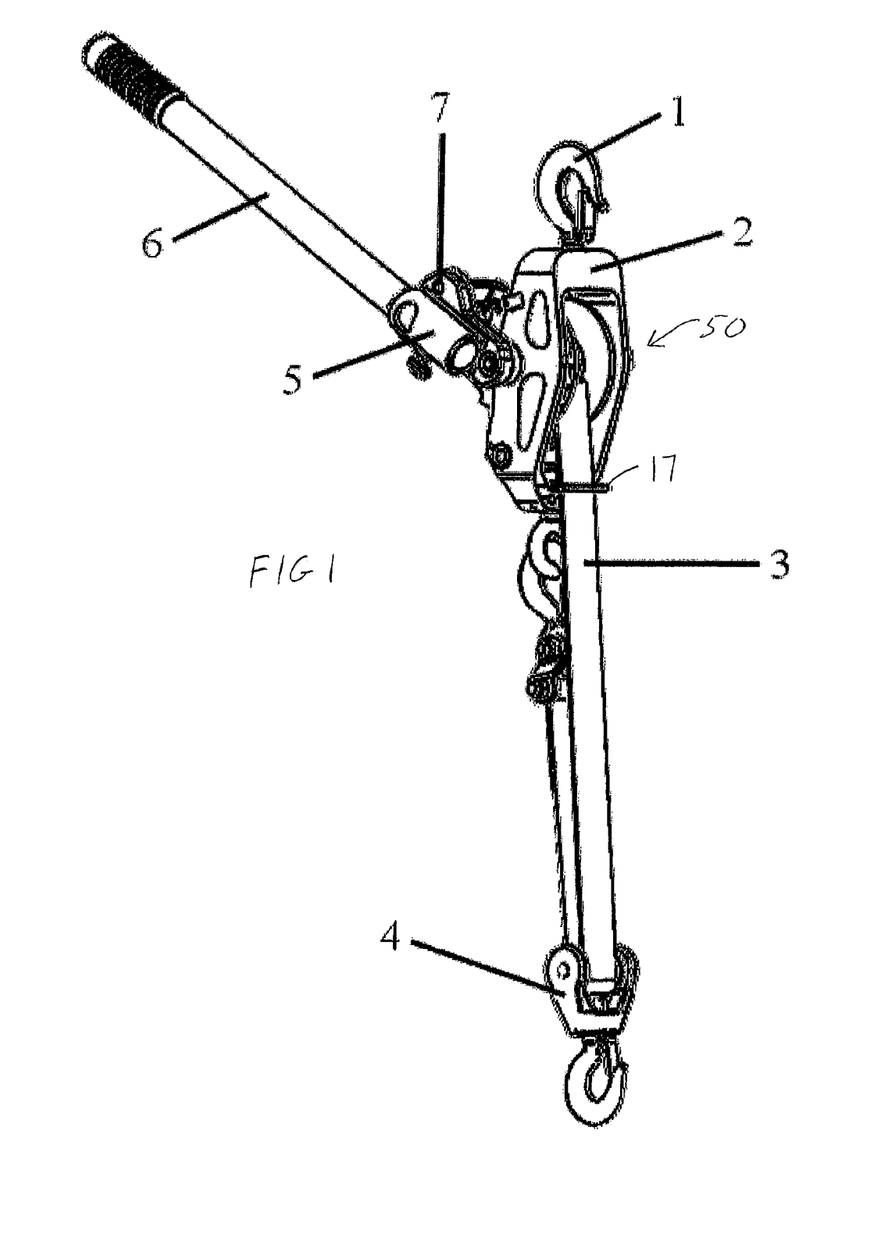
FIG. 1 is perspective view of an embodiment of the winch hoist with overload warning system.
Figure 2:
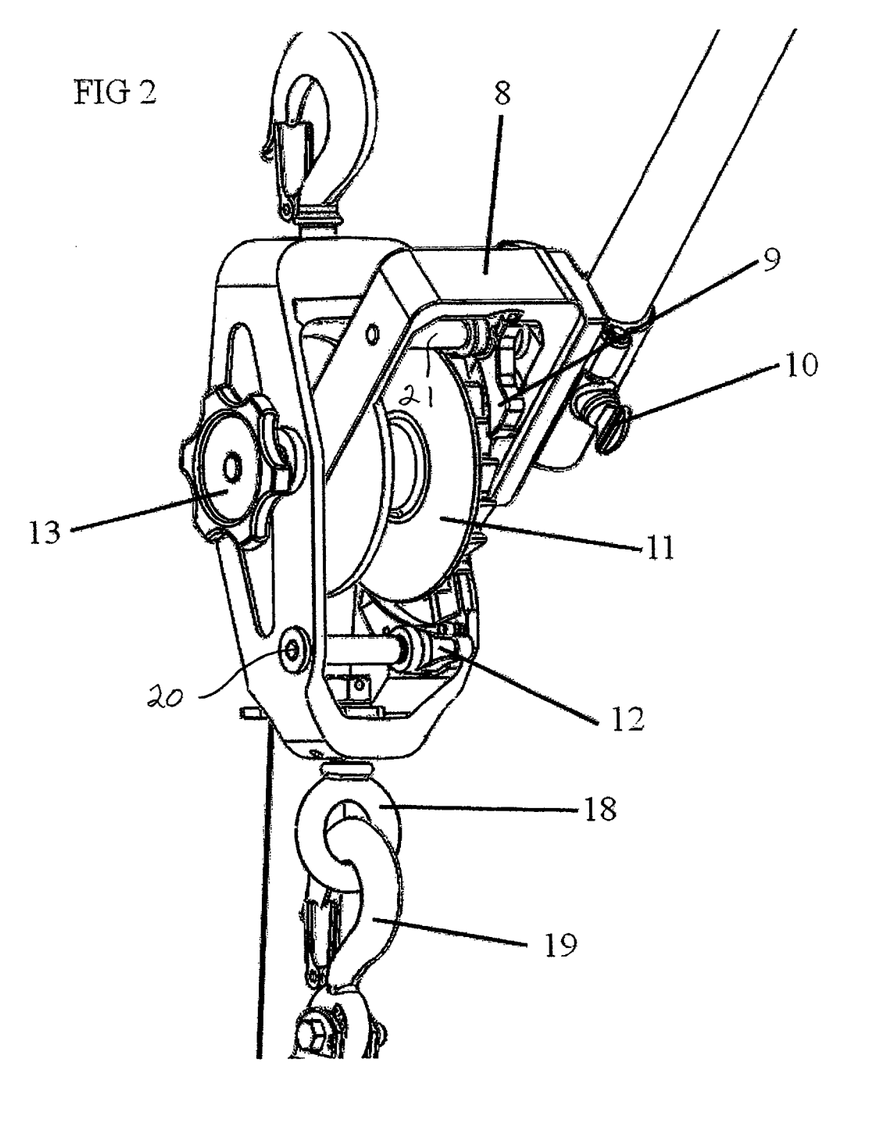
FIG. 2 is a more detailed perspective view of the hoist of FIG. 1 with the strap removed so that certain aspects can be seen more clearly.
Figure 3:
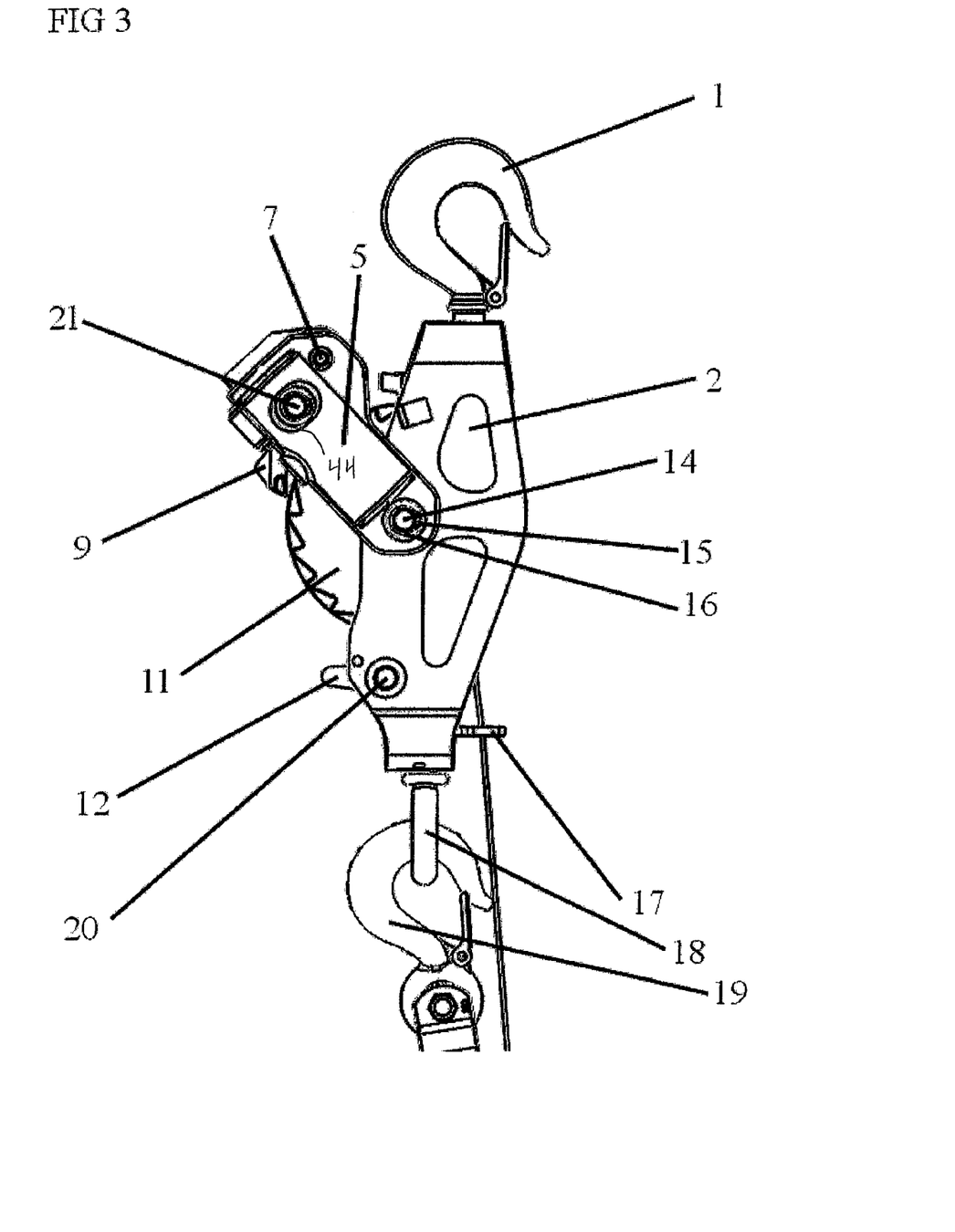
FIG. 3 is a side view of the hoist of FIG. 1.
Figure 4:
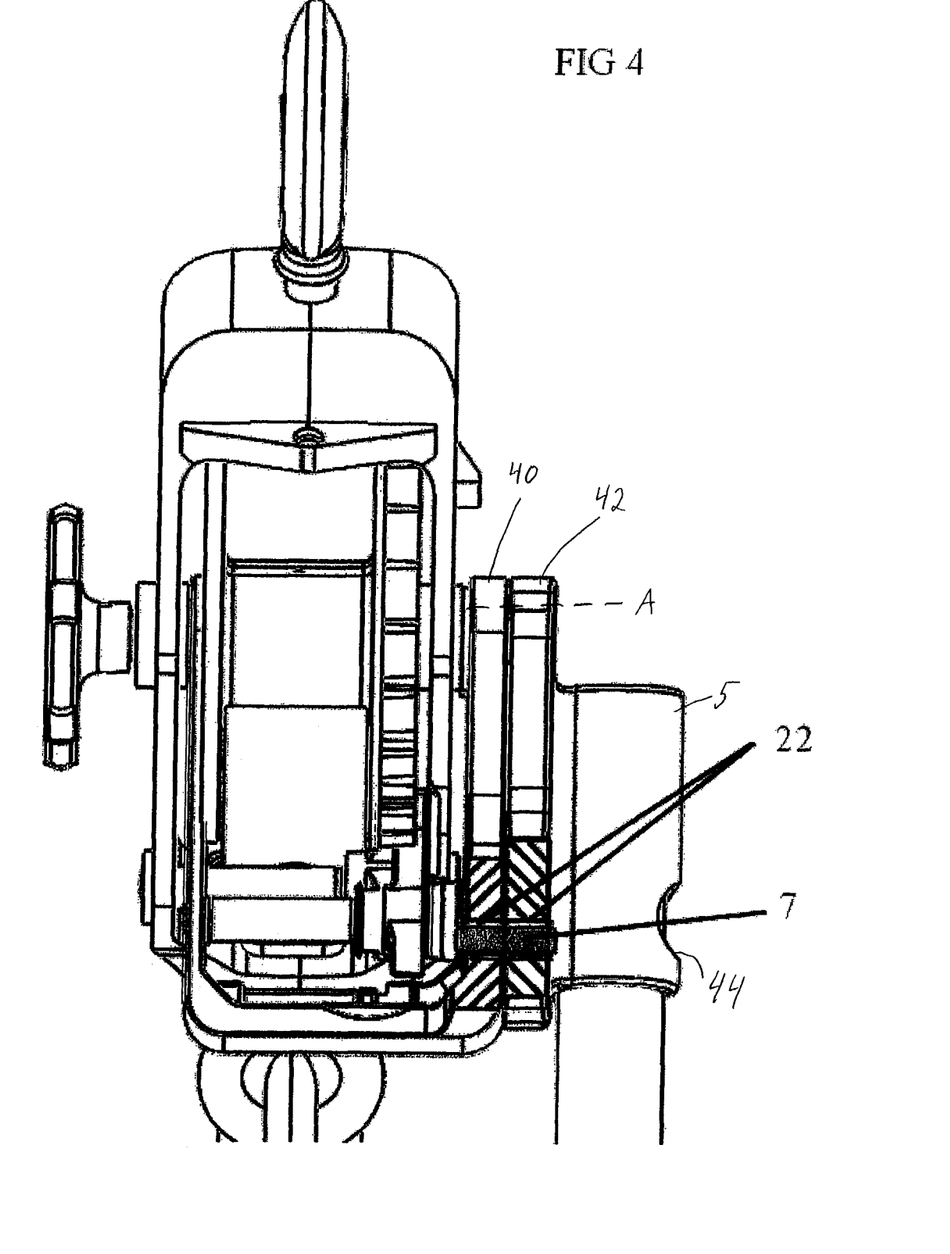
FIG. 4 is partial cross-sectional view of portions of the hoist of FIG. 1, showing the shear pin and its engagement with the socket and frame.
Figure 7:
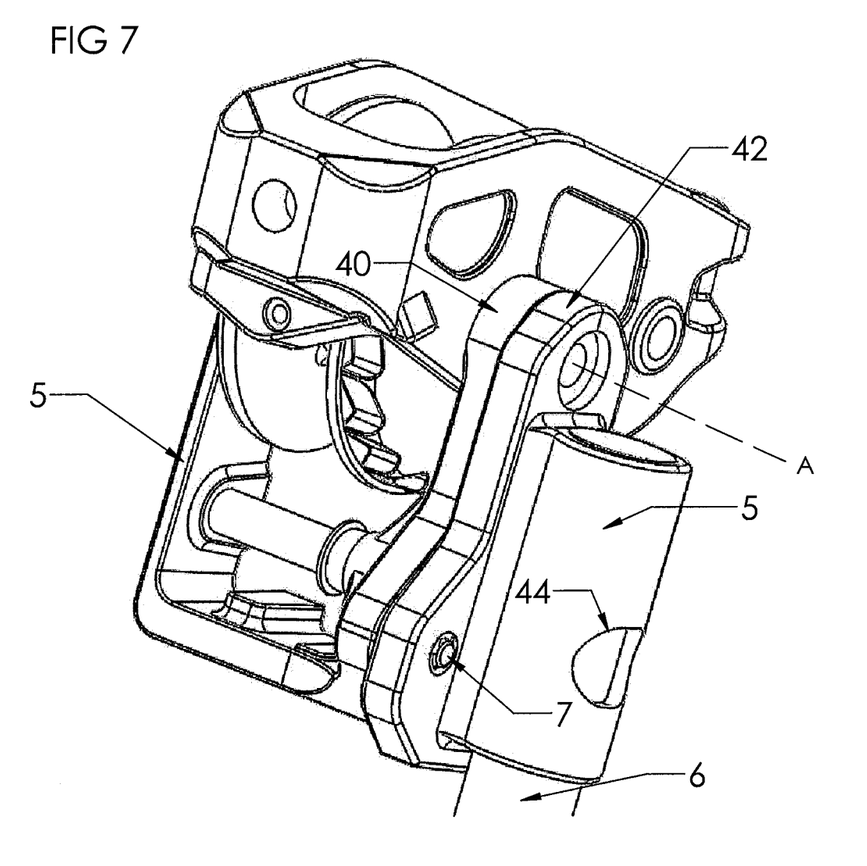
FIG. 7 is a perspective view of the frame and socket.
Figure 8:
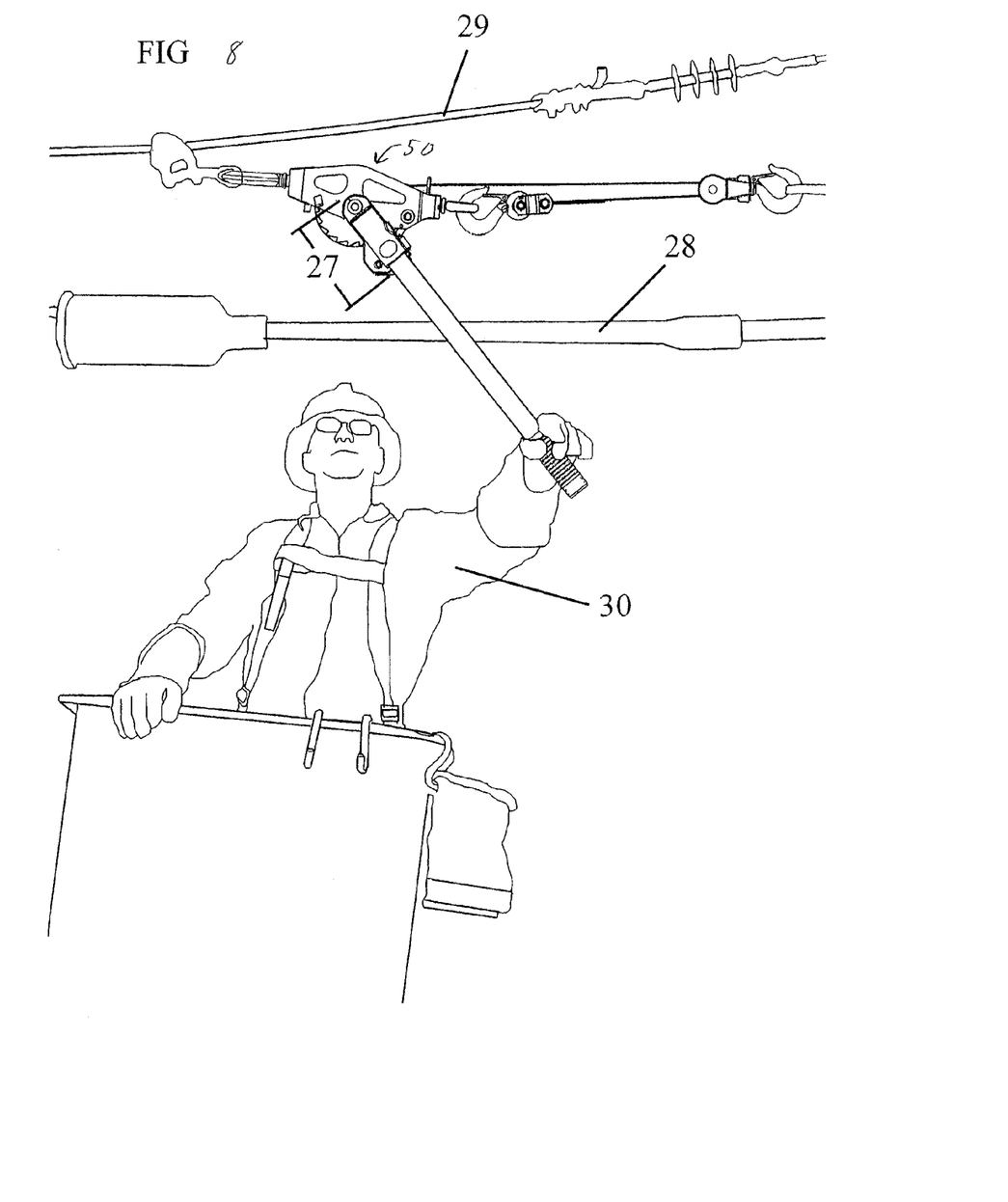
FIG. 8 shows the winch hoist in use by a lineman.

The overload warning system preferably uses the contours of the movable frame 8 and a socket 5 to house and protect a shear pin device 7. The socket and frame can be cast. Socket 5 uses the drum shaft 14 as the pivot for the handle 6. The socket is attached to the drum shaft at one end by an appropriate means 15 such as with washer(s) or a bearing and a retaining ring 16. The socket is attached to the pawl shaft 21 at the other end with an appropriate means such as a washer 25 and a retaining ring 26. See FIG. 3. The insulating fiberglass handle 6 is held in position within the socket by means of a thumb screw 10 or a knurled screw.

Figure 5:
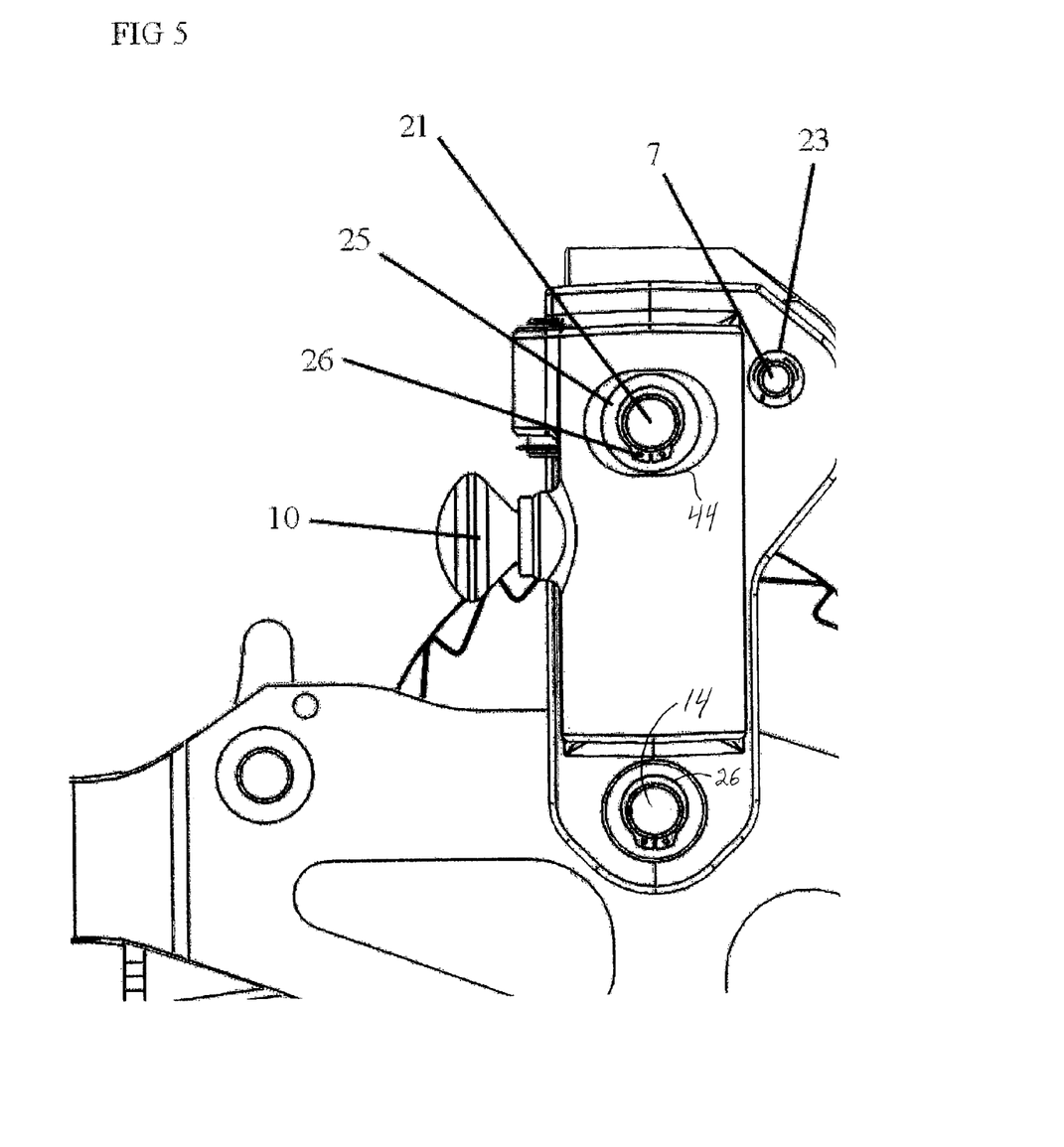
FIG. 5 is a greatly enlarged side view of the socket and frame.
Figure 9:
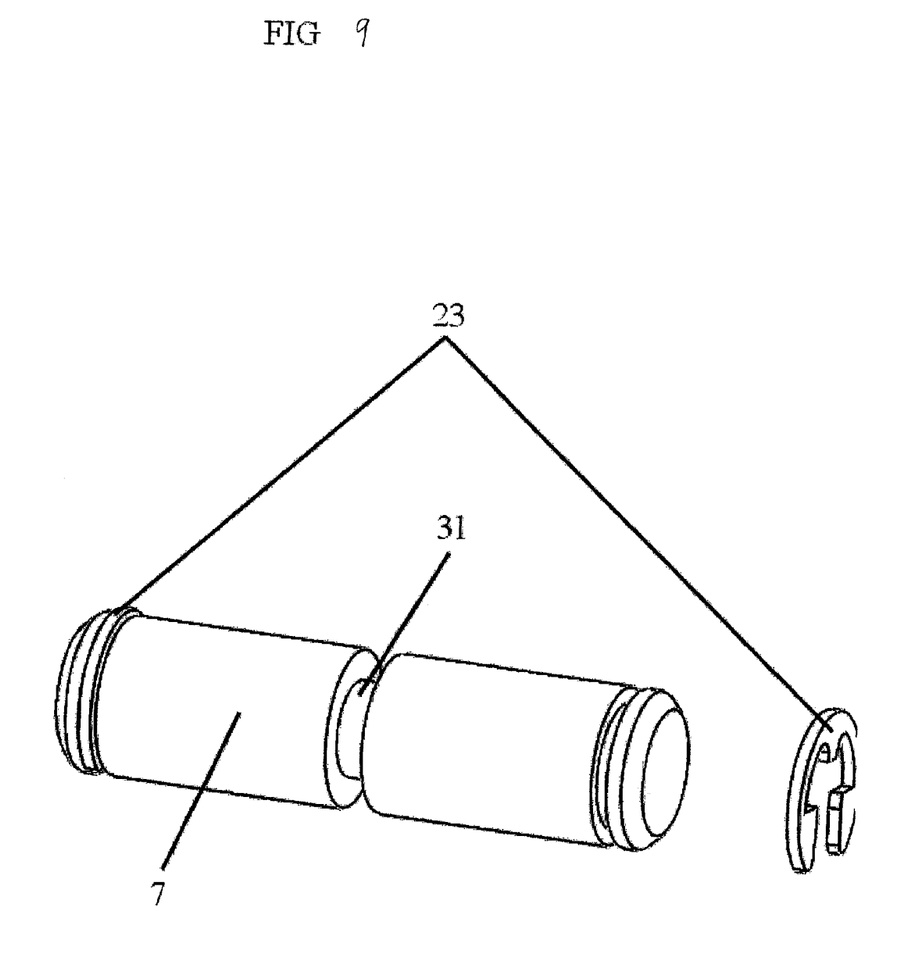
FIG. 9 is an enlarged exploded view of an embodiment of the shear pin for the winch hoist.

Rotational loads that are applied to the handle 6 are transmitted from flange 42 of socket casting 5 to closely-spaced thickened leg 40 of frame 8 through the shear pin 7, to cause frame 8 to pivot about the drum shaft axis (axis "A"). A pair of hardened steel bushings 22, one located in each of leg 40 and flange 42, surround the shear pin 7 to distribute loads from socket flange 42 through pin 7 to leg 40 and thus frame 8. Bushings 22 also define a distinct shear zone located in the space between the socket flange and leg. The shear pin 7 has a reduced section 31 in the shear zone that falls between the bushings 22. This reduced section can be varied in cross-sectional area based on the hoist model and capacity. In an embodiment the shear pin 7 cross section is round. A grooving operation produces the reduced area. Other shapes and manufacturing methods may be used.

Figure 6:
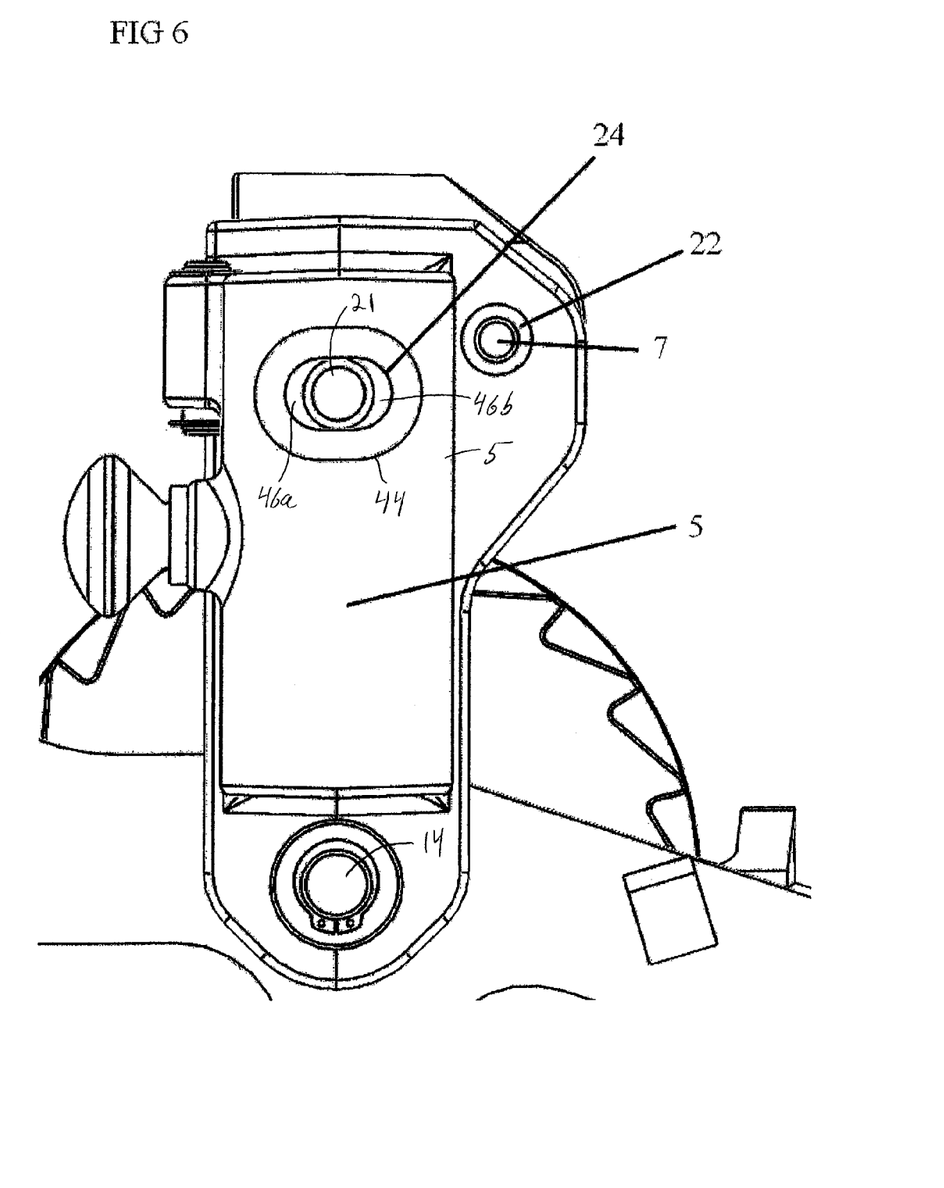
FIG. 6 is a similar view but with certain parts removed to illustrate detail that is hidden when the winch hoist is in use.

FIG. 6 shows detail that is hidden from view in normal use by handle 6 and pawl shaft retaining washer 25 and retaining ring 26. An elongated hole 24 in the flange 42 of socket 5 (visible in FIG. 6 through oval access opening 44 in the opposite sidewall of socket 5) defines spaces 46a and 46b between shaft 21 and flange 42. Shear pin 7 normally carries the force from socket 5 to frame 8. When shear pin 7 fails, socket 5 will pivot relative to frame 8 about drum shaft 14; this provides tactile feedback to the user that the shear pin has failed, which indicates that the safe load has been exceeded. Hole 24 provides a containment mechanism when the shear pin fails, as pawl shaft 21 will move through space 46a or space 46b and then contact the edge of hole 24 to prevent further rotation of the socket relative to the frame. This allows full control of the hoist and the load after shear pin failure. Elongated hole 24 allows limited, defined handle movement relative to pawl shaft 21. Upon failure of shear pin 7, the elongation of hole 24 provides enough movement to clearly indicate through tactile feedback that an overload condition has been reached.

Shear pin 7 must be capable of resisting loads within the desired range, while providing an appropriate shear load and shear characteristics. 5/16" round cold drawn steel of low to medium carbon content is an appropriate material. Pressed and sintered powdered ferrous materials also may be used. A groove 31 of approximately 0.080" width and 0.083" depth accomplishes a reduced diameter of 0.146" in the pin shear region. The shear pin is held in place in the frame and socket by use of retaining rings 23. Alternate designs of the shear pin can use a head on one end of the pin and other means of retention of the pin in the frame and socket (e.g., a receiving cavity for the head and screw threads on the other end of the pin) to allow for easier changing of the pin after failure.

Other embodiments will occur to those skilled in the field from this description and are within the scope of the claims.

What is claimed is:

1. An overload warning system for a winch hoist of the type that includes: a drum that rotates about a drum shaft; a handle that is received in a socket, wherein the handle can be used to turn the drum; and a movable frame that is located between the socket and the housing, the system comprising:
   the socket being coupled to the drum shaft;
   a shear pin embedded in the frame and embedded in the socket, and defining a relatively weak shear zone located between the frame and the socket;
   an elongated opening defined in the socket; and
   a projection projecting from the frame and into or through the elongated opening;
   wherein if the shear pin fails under rotational load applied through the handle the socket will rotate relative to the frame until the edge of the elongated opening contacts the projection, such that the socket movement provides tactile feedback that the shear pin has failed while maintaining control over the hoist operation via the handle.

2. The system of claim 1 in which the hoist includes a movable pawl carried by a pawl shaft, and the projection comprises an extension of the pawl shaft.

3. The system of claim 2 in which the socket defines a flange that lies adjacent to but spaced from the frame.

4. The system of claim 3 in which the frame defines a thickened leg that is adjacent to the socket flange.

5. The system of claim 4 in which the pin is held in the socket flange and in the thickened leg and spans the space between them.

6. The system of claim 5 further comprising hardened bushings in the socket flange and the leg that hold the pin.

7. The system of claim 6 in which the pin defines a reduced cross-sectional area that is located in the space between the socket flange and the thickened leg so as to define a pin shear zone.

8. The system of claim 2 in which the pawl shaft extension defines an end that is located in or immediately adjacent to the elongated opening.

9. The system of claim 8 in which the pawl shaft extension end is held in the socket such that the socket can move relative to the pawl shaft until the pawl shaft extension contacts the edge of the elongated opening.

10. The system of claim 9 in which the pawl shaft is closer to the drum shaft than is the shear pin.

11. The system of claim 1 in which the frame defines an outer contour and the socket does not extend beyond this contour.

12. An overload warning system for a winch hoist of the type that includes: a drum that rotates about a drum shaft; a handle that is received in a socket, wherein the handle can be used to turn the drum; and a movable frame that is located between the socket and the housing, the system comprising:
- the socket being coupled to the drum shaft;
- a shear pin embedded in the frame and embedded in the socket, and defining a relatively weak shear zone located between the frame and the socket;
- an elongated opening defined in the socket;
- a projection projecting from the frame and into the elongated opening, in which the hoist includes a movable pawl carried by a pawl shaft and the projection comprises an extension of the pawl shaft, wherein the pawl shaft extension defines an end that is located in or immediately adjacent to the elongated opening and this pawl shaft extension end is held in the socket such that the socket can move relative to the pawl shaft until the pawl shaft extension contacts the edge of the elongated opening, and which the pawl shaft is closer to the drum shaft than is the shear pin;
- in which the socket defines a flange that lies adjacent to but spaced from the frame and the frame defines a thickened leg that is adjacent to the socket flange, in which the frame defines an outer contour and the socket does not extend beyond this contour, and wherein the pin is held in the socket flange and in the thickened leg and spans the space between them;
- hardened bushings in the socket flange and the leg that hold the pin, in which the pin defines a reduced cross-sectional area that is located in the space between the socket flange and the thickened leg so as to define a pin shear zone; and
- wherein if the shear pin fails under rotational load applied through the handle the socket will rotate relative to the frame until the edge of the elongated opening contacts the pawl shaft extension, such that the socket movement provides tactile feedback that the shear pin has failed while maintaining control over the hoist operation via the handle.

* * * * *